US 12,218,605 B2

(12) United States Patent
Inazumi et al.

(10) Patent No.: US 12,218,605 B2
(45) Date of Patent: Feb. 4, 2025

(54) POWER CONVERSION DEVICE AND VEHICLE

(71) Applicant: HONDA MOTOR CO., LTD., Tokyo (JP)

(72) Inventors: Takuya Inazumi, Tokyo (JP); Heisuke Kobayashi, Tokyo (JP); Kuri Kasuya, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 28 days.

(21) Appl. No.: 18/128,304

(22) Filed: Mar. 30, 2023

(65) Prior Publication Data

US 2023/0318479 A1    Oct. 5, 2023

(30) Foreign Application Priority Data

Mar. 31, 2022   (JP) ................. 2022-058849

(51) Int. Cl.
*H02M 7/00* (2006.01)
*B60L 50/75* (2019.01)
*B60L 53/22* (2019.01)

(52) U.S. Cl.
CPC ............. *H02M 7/003* (2013.01); *B60L 50/75* (2019.02); *B60L 53/22* (2019.02)

(58) Field of Classification Search
CPC .................................................. H02M 7/4835
See application file for complete search history.

(56) References Cited

U.S. PATENT DOCUMENTS

| | | | |
|---|---|---|---|
| 2012/0028135 A1* | 2/2012 | Ohashi | B60L 50/72 |
| | | | 429/400 |
| 2019/0199129 A1* | 6/2019 | Kobayashi | H02S 50/00 |
| 2020/0127584 A1* | 4/2020 | Shi | H02M 7/797 |
| 2020/0292629 A1* | 9/2020 | He | H02M 7/537 |
| 2020/0321851 A1* | 10/2020 | Sakai | H02M 7/5387 |
| 2021/0234475 A1* | 7/2021 | Banerjee | H02M 7/72 |
| 2022/0181981 A1* | 6/2022 | Suzuki | H02M 3/33569 |

FOREIGN PATENT DOCUMENTS

JP           2012-187949 A     10/2012

* cited by examiner

*Primary Examiner* — Jared Fureman
*Assistant Examiner* — Esayas G Yeshaw
(74) *Attorney, Agent, or Firm* — Carrier, Shende & Associates P.C.; Joseph P. Carrier; Jeffrey T. Gedeon

(57) ABSTRACT

A power conversion device includes a main body portion that converts inputted current, an output portion that is separate from the main body portion and includes an output terminal portion that outputs current converted by the main body portion, and a conductive member that connects the main body portion and the output portion with each other and transmits the current from the main body portion to the output terminal portion.

6 Claims, 3 Drawing Sheets

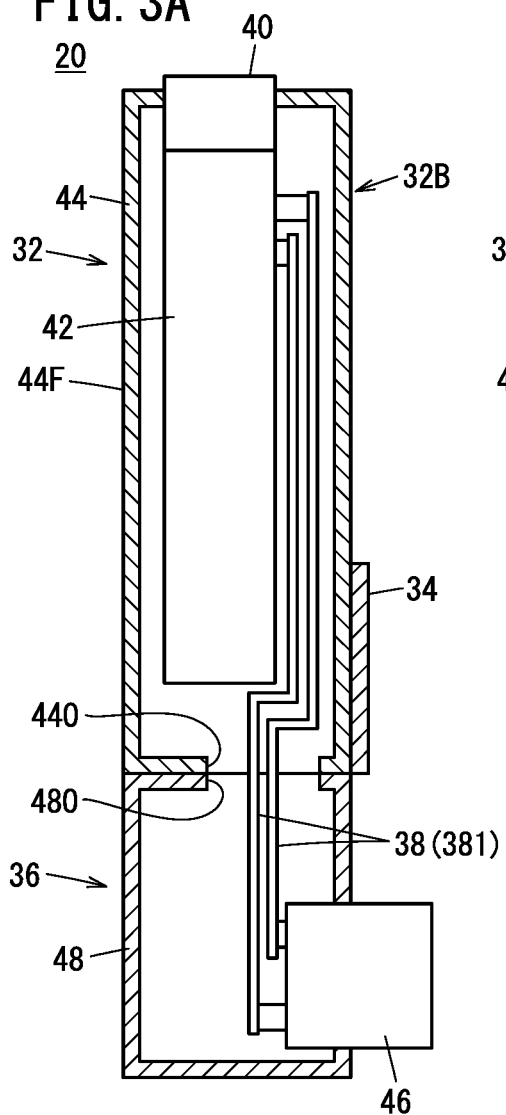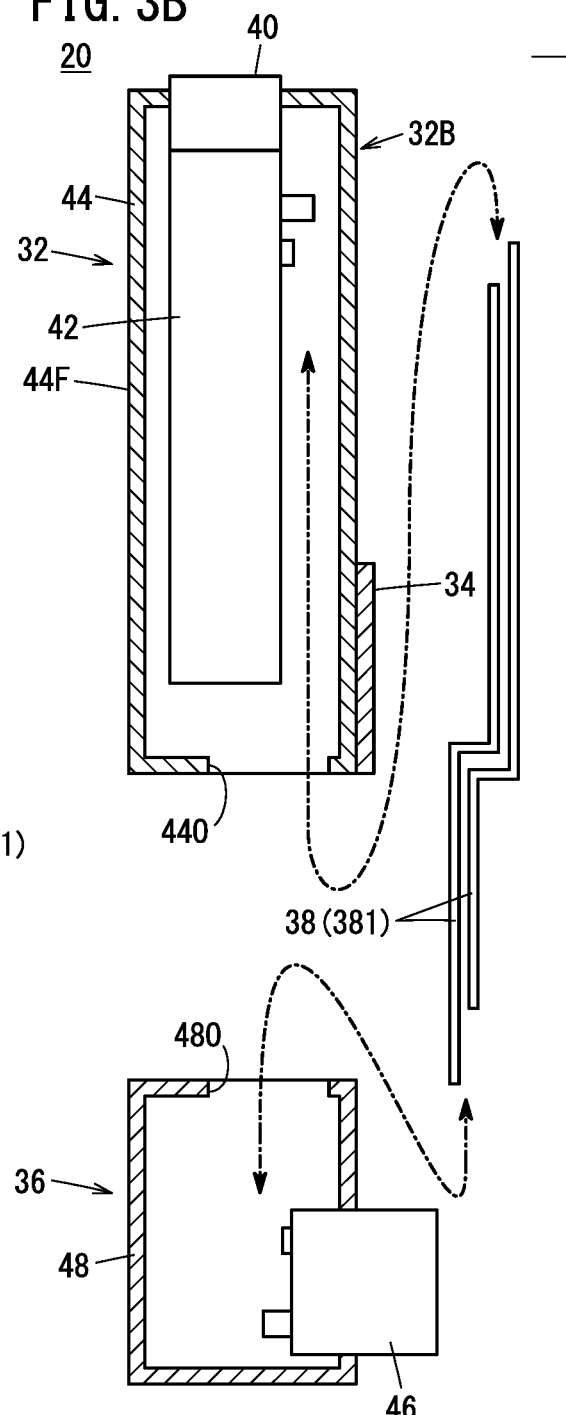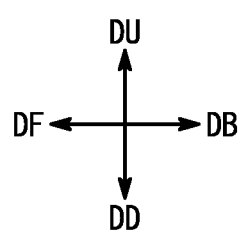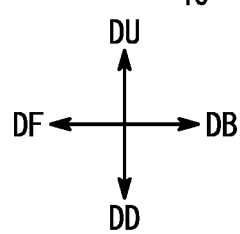

POWER CONVERSION DEVICE AND VEHICLE

CROSS-REFERENCE TO RELATED APPLICATIONS

This application is based upon and claims the benefit of priority from Japanese Patent Application No. 2022-058849 filed on Mar. 31, 2022, the contents of which are incorporated herein by reference.

BACKGROUND OF THE INVENTION

Field of the Invention

The present invention relates to a power conversion device for converting electric current and a vehicle equipped with the power conversion device.

Description of the Related Art

In recent years, there has been research and development on fuel cells that contribute to energy efficiency to ensure access to affordable, reliable, sustainable, and modern energy.

For example, research and development of a fuel cell vehicle equipped with a fuel cell has been conducted. A fuel cell vehicle is a vehicle that runs using output power from a fuel cell.

The fuel cell vehicle further includes a power conversion device. The power conversion device is a device for converting input power (JP 2012-187949 A). A power conversion device disclosed in JP 2012-187949 A is disposed at a front portion of a fuel cell vehicle.

SUMMARY OF THE INVENTION

The output power of the power conversion device is supplied to a rotary electric machine, a secondary battery, and the like provided in the fuel cell vehicle. Here, the output terminal portion of the power conversion apparatus is connected to the rotary electric machine and the secondary battery via a wiring member such as a high-voltage cable.

It is preferable that a wiring member such as a high-voltage cable is provided so as not to interfere with other members when pressure is applied to the front of the vehicle.

An object of the present invention is to solve the aforementioned problems.

A first aspect of the present invention is a power conversion device including a main body portion that converts inputted electric power, an output portion that is separate from the main body portion and includes an output terminal portion that outputs electric power converted by the main body portion, and a conductive member that connects the main body portion and the output portion with each other and transmits the electric power from the main body portion to the output terminal section.

A second aspect of the present invention is a vehicle including the power conversion device according to the first aspect, wherein the power conversion device is installed in a motive power compartment that is formed further forward than a passenger compartment, the vehicle includes a dash panel that is installed between the motive power compartment and the passenger compartment, and a wiring member that is connected to the output terminal portion, the output portion is disposed below the main body portion, the output terminal portion is provided at a rear portion of the output portion, and the motive power compartment includes an evacuation space between the dash panel and a lower portion of the vehicle for evacuating the output portion and the wiring member rearward.

According to the present invention, since the degree of freedom in the layout of the wiring members is improved, the wiring members can be provided so as not to interfere with other members when pressure is applied to the front side of the vehicle.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 3A is a cross-sectional view taken along line IIIA-IIIA of FIG. 2. FIG. 3B is an exploded view of the power conversion device of FIG. 3A.

DETAILED DESCRIPTION OF THE INVENTION

Embodiment

Figure 1:
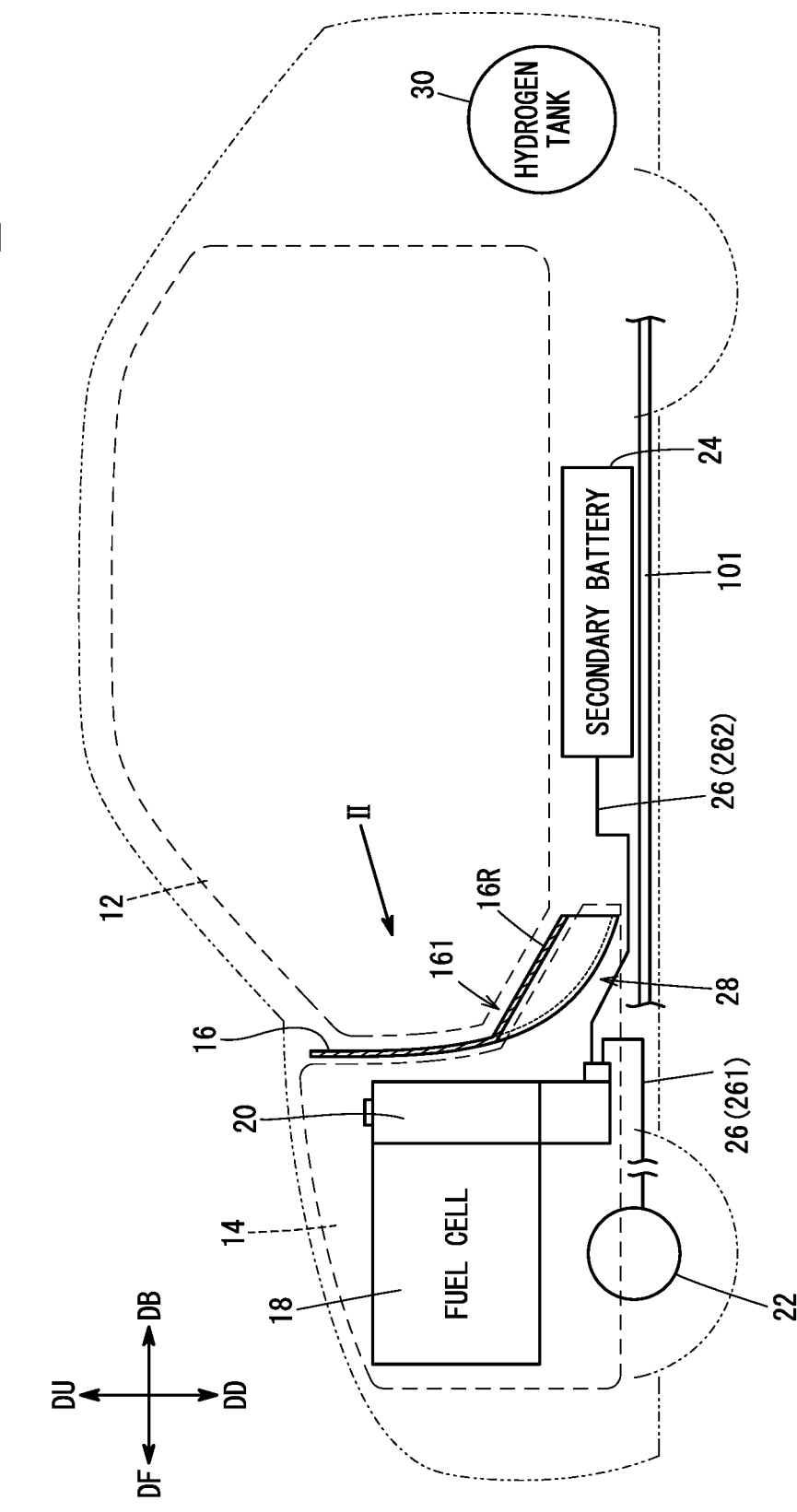
FIG. 1 is a configuration diagram of a vehicle according to an embodiment.

FIG. 1 is a configuration diagram of a vehicle 10 according to an embodiment.

In FIG. 1, an arrow DF indicates a forward direction. An arrow DB indicates a rearward direction opposite to the forward direction. In FIG. 1, an arrow DD indicates a downward direction (gravity direction). An arrow DU indicates an upward direction opposite to the downward direction. The longitudinal direction and the vertical direction are orthogonal to each other.

The vehicle 10 is a fuel cell vehicle having a passenger compartment 12 and a motive power compartment 14. The motive power compartment 14 is disposed further forward than the passenger compartment 12. However, at least a part of the motive power compartment 14 (such as an evacuation space 28, which will be described later) may extend below the passenger compartment 12.

The vehicle 10 includes a dash panel 16, a fuel cell 18, a power conversion device 20, a rotary electric machine 22, a secondary battery 24, and a plurality of wiring members 26 (261, 262).

The dash panel 16 is a plate member extending in the vertical direction so as to separate the passenger compartment 12 and the motive power compartment 14 from each other. A lower portion 161 of the dash panel 16 may be bent rearward. Further, the dash panel 16 forms the evacuation space 28 between the dash panel 16 and a lower portion 101 of the vehicle 10. The evacuation space 28 is located between the lower portion 101 of the vehicle 10 and the passenger compartment 12.

The evacuation space 28 is an empty space in the motive power compartment 14. However, the evacuation space 28 has a width capable of accommodating an output portion 36 of the power conversion device 20 and the wiring member 26. The wiring member 26 and the output portion 36 of the power conversion device 20 will be described in more detail later.

Figure 2:
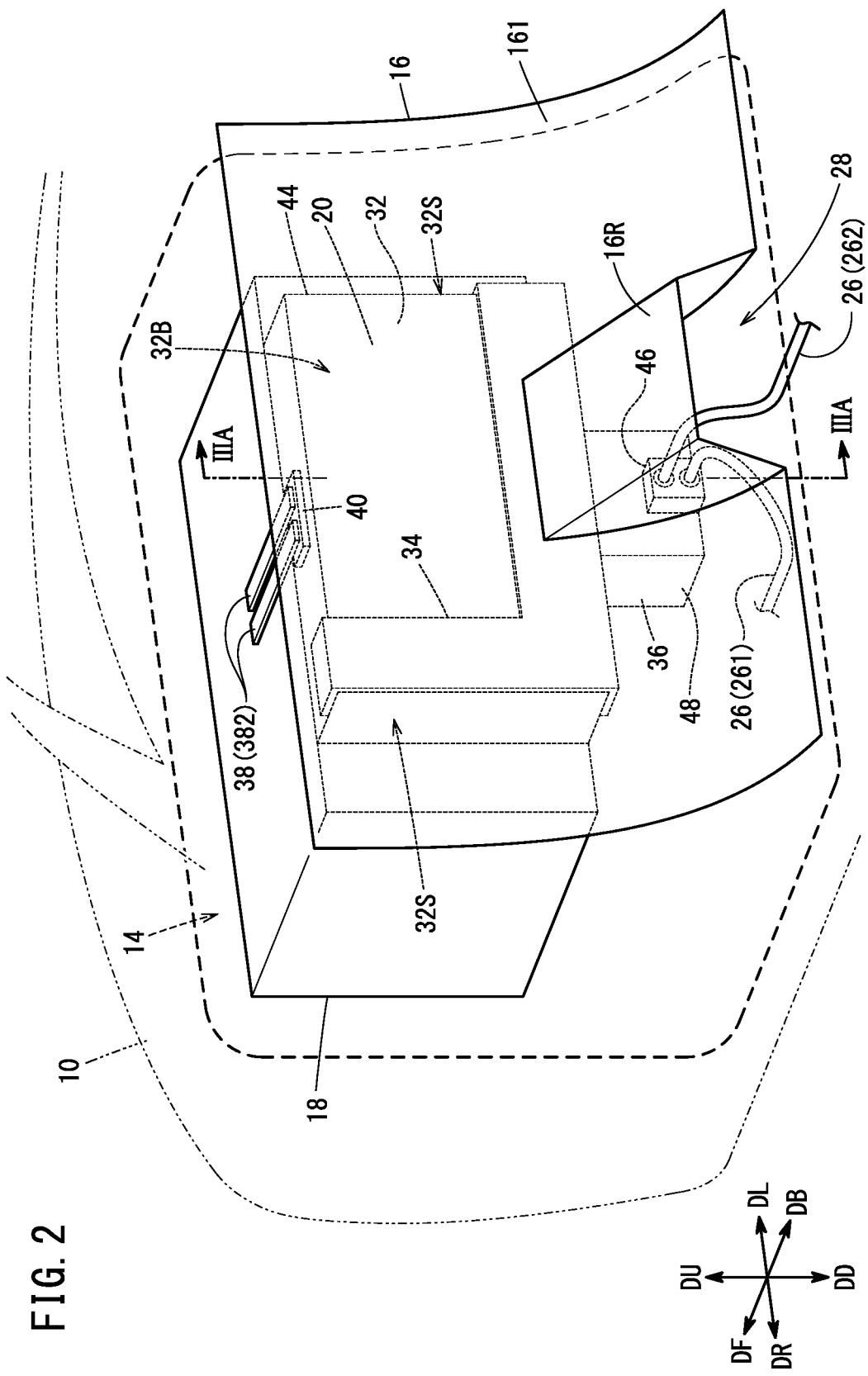
FIG. 2 is a perspective view showing a fuel cell, a power conversion device, a dash panel, and an evacuation space.

FIG. 2 is a perspective view showing the fuel cell 18, the power conversion device 20, the dash panel 16, and the evacuation space 28. The direction of this perspective view is along arrow II in FIG. 1.

In FIG. 2, the arrow DL indicates a left direction. The arrow DR indicates a right direction opposite to the left direction. The left-right direction is orthogonal to the front-rear up-down (vertical) direction described above.

The dash panel 16 illustrated in this embodiment has a recess 16R that is recessed in the rearward direction. The recess 16R is formed at the lower portion 161 of the dash panel 16. In the present embodiment, the evacuation space 28 refers to a space formed by the lower portion 101 of the vehicle 10 and especially the recess 16R of the dash panel 16.

The fuel cell 18 is a power generating device that generates power by utilizing chemical reactions between hydrogen and oxygen. The fuel cell 18 is disposed further forward than the dash panel 16 in the motive power compartment 14.

The hydrogen required for power generation is supplied from the hydrogen tank 30 to the fuel cell 18. The hydrogen tank 30 is provided at, for example, a rear portion of the vehicle 10 (see FIG. 1). Air, for example, is supplied to the fuel cell 18. In this case, the fuel cell 18 can generate power by utilizing chemical reactions between hydrogen supplied from the hydrogen tank 30 and oxygen in the air.

In the motive power compartment 14, the power conversion device 20 is arranged further rearward than the fuel cell 18 and further forward than the dash panel 16. The power conversion device 20 converts the electric power input from the fuel cell 18 and supplies the converted electric power to the rotary electric machine 22, the secondary battery 24, and suchlike. The power conversion device 20 includes, for example, a boost converter.

The rotary electric machine 22 rotates using electric power supplied from the power conversion device 20. The rotational force of the rotary electric machine 22 is transmitted to the drive wheels (for example, front wheels) of the vehicle 10 via a transmission mechanism such as a transmission.

The secondary battery 24 is installed, for example, between the passenger compartment 12 and the lower portion 101 of the vehicle 10. Further, the secondary battery 24 is disposed further rearward than the evacuation space 28 (see FIG. 1). The secondary battery 24 stores electric power supplied from the power conversion device 20. The electric power stored in the secondary battery 24 is supplied to the rotary electric machine 22 as necessary.

The power conversion device 20 and the secondary battery 24 supply power to the rotary electric machine 22 via an inverter. The illustration of the inverter is omitted.

Each of the plurality of wiring members 26 is, for example, a high-voltage cable. The plurality of wiring members 26 includes a wiring member 261 and a wiring member 262.

The wiring member 261 connects the power conversion device 20 and the rotary electric machine 22. The power conversion device 20 supplies power to the rotary electric machine 22 via the wiring member 261.

The wiring member 262 connects the power conversion device 20 and the secondary battery 24. The power conversion device 20 supplies power to the secondary battery 24 via the wiring member 262. It should be noted that the wiring member 262 may pass through the evacuation space 28. In this way, the wiring member 262 hardly interferes with other members.

FIG. 3A is a cross-sectional view taken along line IIIA-IIIA of FIG. 2. FIG. 3B is an exploded view of the power conversion device 20 of FIG. 3A.

In the following, the power conversion device 20 is further described. The power conversion device 20 includes a main body portion 32, a buffer member 34, an output portion 36, and a plurality of conductive members 381. The main body portion 32 includes an input terminal portion 40, a conversion module 42, and a first housing 44.

The input terminal portion 40 has an input terminal (a group of input terminals) connected to the fuel cell 18. The fuel cell 18 and the input terminal portion 40 are connected via a conductive member 382 (see FIG. 2). The conductive member 382 is, for example, a bus bar. The electric power generated by the fuel cell 18 is input to the input terminal portion 40 via the conductive member 382.

The input terminal portion 40 is provided at an upper portion of the main body portion 32. However, the arrangement of the input terminal portion 40 at the main body portion 32 may be changed as necessary.

The conversion module 42 includes a predetermined electric circuit for converting the input power. The electric circuit is, for example, a transformer. The conversion module 42 is connected to the input terminal portion 40. The power of the fuel cell 18 is input to the conversion module 42 via the input terminal portion 40.

The first housing 44 houses the input terminal portion 40 and the conversion module 42. However, part of the input terminal portion 40 is exposed to the outside of the first housing 44 in order to allow connection between the input terminal portion 40 and the fuel cell 18. The first housing 44 has a first communicating portion 440. The first communicating portion 440 is an opening for communicating the inside of the first housing 44 and the inside of the output portion 36 with each other. The first communicating portion 440 is formed at a contact portion (contact surface) of the first housing 44 contacting the output portion 36.

The main body portion 32 may be attached to the fuel cell 18. For example, a front portion 44F of the first housing 44 is attached to the fuel cell 18. Further, a cooling path through which a refrigerant for cooling at least one of the main body portion 32 and the fuel cell 18 flows may be disposed between the main body portion 32 and the fuel cell 18.

The buffer member 34 is a guard member for absorbing stress received by the main body portion 32 when pressure is applied from the front side of the vehicle 10. When pressure is applied from the front side of the vehicle 10, the stress received by the main body portion 32 is relaxed, whereby the possibility of the main body portion 32 being damaged is reduced.

The buffer member 34 is attached to a rear portion 32B of the main body portion 32. However, the arrangement of the buffer member 34 may be changed as necessary. For example, the buffer member 34 may be attached to a side portion 32S of the main body portion 32. A plurality of buffer members 34 may be attached to the main body portion 32.

The output portion 36 is a separate part from the main body portion 32. The output portion 36 includes an output terminal portion 46 and a second housing 48.

The output terminal portion 46 has output terminals (output terminal groups) connected to the plurality of wiring members 26. The output terminal portion 46 is provided so as to face in a direction orthogonal to the arrangement direction of the main body portion 32 and the output portion 36. In this embodiment, the main body portion 32 and the output portion 36 are arranged in the vertical direction. The output terminal portion 46 illustrated in FIGS. 3A and 3B faces in the rear direction.

The second housing 48 accommodates the output terminal portion 46. However, part of the output terminal portion 46 is exposed to the outside of the second housing 48 in order to allow connection between the output terminal portion 46 and the rotary electric machine 22, the secondary battery 24, and the like. The second housing 48 has a second communicating portion 480. The second communicating portion 480, as the first communicating portion 440 of the first housing 44, is an opening for communicating the inside of the first housing 44 and the inside of the second housing 48 with each other. The second communicating portion 480 is formed at a contact portion (contact surface) of the second housing 48 contacting the first housing 44.

The second housing 48 is fastened together with the first housing 44 using a bolt, for example. In this case, the first housing 44 attached to the fuel cell 18 can support the second housing 48.

Thus, the output portion 36 can be disposed further forward than the evacuation space 28. In this case, when pressure is applied to the front side of the vehicle 10, the output portion 36 moves rearward, being evacuated to the evacuation space 28. When the output portion 36 moves rearward, the main body portion 32 may move rearward together with the output portion 36.

Since the output portion 36 is evacuated to the evacuation space 28, the plurality of wiring members 26 connected to the output terminal portion 46 can also be evacuated to the evacuation space 28. As a result, members having been installed outside the evacuation space 28 and the plurality of wiring members 26 having been evacuated in the evacuation space 28 are prevented from interfering with each other due to the influence of the pressure.

As described above, the power conversion device 20 is disposed between the fuel cell 18 and the dash panel 16. That is, the power conversion device 20 is disposed between the fuel cell 18 and the evacuation space 28. In this case, the fuel cell 18 is not provided between the power conversion device 20 and the evacuation space 28. Therefore, the layout of the wiring member 262 can be simplified.

Each of the plurality of conductive members 381 is, for example, a bus bar. The bus bar is a conductive member capable of stably transmitting a large current. The plurality of conductive members 381 are inserted through the first communicating portion 440 and the second communicating portion 480. Therefore, part of each conductive member 381 is accommodated in the first housing 44. A portion of each conductive member 381 that is not accommodated in the first housing 44 is accommodated in the second housing 48.

The plurality of conductive members 381 connect the conversion module 42 and the output terminal portion 46. For example, each conductive member 381 is jointly fastened to the conversion module 42 and the output terminal portion 46 using a bolt.

Since the conversion module 42 and the output terminal portion 46 are connected through the plurality of conductive members 381, the electric power converted by the conversion module 42 is transmitted to the output terminal portion 46 through the plurality of conductive members 381. Thus, the electric power converted by the conversion module 42 is supplied from the output terminal portion 46 to the rotary electric machine 22, the secondary battery 24, and so on through the plurality of conductive members 381.

According to the power conversion device 20 described above, the main body portion 32 and the output portion 36 are separate bodies. Therefore, the degree of freedom in the layout of the vehicle 10 with respect to the wiring member 26 is improved.

For example, the evacuation space 28 of the vehicle 10 shown in the present embodiment is formed further rearward than the power conversion device 20. In this case, in order to protect the plurality of wiring members 26, the output terminal portion 46 and the like from the pressure applied from the front side of the vehicle 10 as much as possible, it is preferable that the output terminal portion 46 face toward the evacuation space 28.

Further, the secondary battery 24 of the vehicle 10 shown in the present embodiment is installed further rearward than the power conversion device 20. In this case, in order to avoid interference between the wiring member 262 connecting the power conversion device 20 and the secondary battery 24 and other members installed further forward than the power conversion device 20 as much as possible, it is preferable that the output terminal portion 46 to which the wiring member 262 is connected face toward the secondary battery 24.

In consideration of the above, it is preferable that the output terminal portion 46 face rearward in the vehicle 10 shown in the present embodiment.

However, the layout of the vehicle 10 varies depending on a manufacturer and a vehicle type of the vehicle 10. Therefore, there may be a case where it is desirable that the output terminal portion 46 face right, left, or forward.

In this regard, in the power conversion device 20, since the main body portion 32 and the output portion 36 are separate bodies, it is possible to change the orientation of the output terminal portion 46 without modifying the main body portion 32. Accordingly, various layouts of the vehicle 10 can be easily realized.

Invention Obtained from Embodiment

Hereinafter, the invention that can be understood from the above-described embodiments and modified examples will be described.

First Invention

The first invention is a power conversion device (20) that includes a main body portion (32) that converts inputted electric power, an output portion (36) that is separate from the main body portion and includes an output terminal portion (46) that outputs electric power converted by the main body portion, and a conductive member (381) that connects the main body portion and the output portion with each other and transmits the electric power from the main body portion to the output terminal portion.

Thus, the degree of freedom in the layout of the wiring member is improved so that the wiring members can be provided so as not to interfere with other members when pressure is applied to the front side of the vehicle.

The conductive member may be a bus bar. Thus, a large current can be stably transmitted between the main body portion and the output portion.

The first aspect of the present invention may further include a buffer member (34) that is attached to the main body portion and protects the main body portion from impact. Thus, it is possible to reduce the risk of breakage of the main body portion.

Second Invention

A second invention is a vehicle (10) that includes the power conversion device according to the first invention, wherein in the vehicle, the power conversion device is installed in a motive power compartment (14) that is formed further forward than a passenger compartment (12), the vehicle includes a dash panel (16) that is installed between the motive power compartment and the passenger compartment, and a wiring member (26) that is connected to the output terminal portion, the output portion is disposed below the main body portion, the output terminal portion is provided at the rear of the output portion, and the motive power compartment includes an evacuation space (28) between the dash panel and the lower portion (101) of the vehicle for evacuating the output portion and the wiring member rearward.

Thus, when pressure is applied from the front side of the vehicle, the plurality of wiring members can be protected from the pressure.

The second aspect of the present invention may further include a fuel cell (18) that is installed in the motive power compartment further forward than the power conversion device and supplies power to the main body portion. Thus, when the output portion and the plurality of wiring members are evacuated to the evacuation space, the fuel cell is hardly an obstacle.

The second aspect of the present invention may further includes a secondary battery (24) provided further rearward than the evacuation space and between the passenger compartment and a lower portion of the vehicle, wherein the wiring member may connect the output terminal portion and the secondary battery with each other. Thus, since the wiring member for connecting the output terminal portion and the secondary battery can be laid out in the evacuation space, interference between the wiring member for connecting the output terminal portion and the secondary battery and other members can be prevented.

The present invention is not limited to the above disclosure, and various modifications are possible without departing from the essence and gist of the present invention.

The invention claimed is:

1. A power conversion device comprises:
    a main body portion that converts inputted electric power;
    an output portion that is separate from the main body portion and includes an output terminal portion that outputs the electric power converted by the main body portion; and
    a conductive member that connects the main body portion and the output portion with each other and transmits the electric power from the main body portion to the output terminal portion, wherein
    the output portion is detachably connected to the main body portion, and
    a direction in which the output terminal portion faces is changeable between directions intersecting a direction from the main body portion to the output portion, in a state where the main body portion and the output portion are connected by the conductive member.

2. The power conversion device according to claim 1, wherein the conductive member is a bus bar.

3. The power conversion device according to claim 1, further comprising a buffer member that is attached to the main body portion and protects the main body portion from impact.

4. A vehicle comprising a power conversion device comprising:
    a main body portion that converts inputted electric power;
    an output portion that is separate from the main body portion and includes an output terminal portion that outputs the electric power converted by the main body portion; and
    a conductive member that connects the main body portion and the output portion with each other and transmits the electric power from the main body portion to the output terminal portion
wherein
    in the vehicle, the power conversion device is installed in a motive power compartment that is formed further forward than a passenger compartment,
    the vehicle further comprises
        a dash panel that is installed between the motive power compartment and the passenger compartment, and
        a wiring member that is connected to the output terminal portion,
    the output portion is disposed below the main body portion,
    the output terminal portion is provided at a rear portion of the output portion, and
    the motive power compartment includes an evacuation space between the dash panel and a lower portion of the vehicle for evacuating the output portion and the wiring member rearward.

5. The vehicle according to claim 4, further comprising a fuel cell that is installed further forward than the power conversion device in the motive power compartment and supplies the electric power to the main body portion.

6. The vehicle according to claim 4, further comprising a secondary battery that is provided further rearward than the evacuation space and between the passenger compartment and the lower portion of the vehicle,
    wherein the wiring member connects the output terminal portion and the secondary battery with each other.

* * * * *